US012736207B1

(12) United States Patent
Pardo et al.

(10) Patent No.: US 12,736,207 B1
(45) Date of Patent: Sep. 15, 2026

(54) DYNAMIC HANGING LUMINAIRE

(71) Applicant: Pablo, Inc.

(72) Inventors: Pablo Pardo, San Francisco, CA (US); Fernando Pardo, Moorpark, CA (US); Brian McIntyre, San Francisco, CA (US)

(73) Assignee: Pablo, Inc., San Francisco, CA (US)

( * ) Notice: Subject to any disclaimer, the term of this patent is extended or adjusted under 35 U.S.C. 154(b) by 0 days.

(21) Appl. No.: 19/186,103

(22) Filed: Apr. 22, 2025

(51) Int. Cl.
*F21V 21/24* (2006.01)
*F21V 21/008* (2006.01)
*F21Y 103/10* (2016.01)
*F21Y 115/10* (2016.01)

(52) U.S. Cl.
CPC ............ *F21V 21/24* (2013.01); *F21V 21/008* (2013.01); *F21Y 2103/10* (2016.08); *F21Y 2115/10* (2016.08)

(58) Field of Classification Search
CPC .... F21V 21/008; F21V 21/24; F21V 2103/10; F21V 2115/10
USPC .................. 248/277.1; 362/427; 403/58, 162
See application file for complete search history.

(56) References Cited

U.S. PATENT DOCUMENTS 510,317 A * 12/1893 Berry ...................... F21V 21/24 362/277
1,072,432 A * 9/1913 Crane .................. A61C 19/004 433/79
1,767,369 A * 6/1930 Johnson ................... B60Q 1/34 248/277.1
2,114,914 A * 4/1938 Charles .................... B60Q 1/34 248/277.1
5,629,057 A * 5/1997 Wang ........................ B44C 5/00 428/11
6,299,330 B1 * 10/2001 Michl ..................... F21V 21/24 362/249.14
10,240,766 B1 * 3/2019 Woodworth ............ F21V 23/04
2004/0246725 A1 * 12/2004 Eldridge ............... F21V 17/007 362/352
2008/0259632 A1 * 10/2008 Chien .................... H04N 23/51 362/565
2010/0238663 A1 * 9/2010 Chen ....................... F21V 17/02 362/249.03
2015/0300560 A1 * 10/2015 Matsuoka ............ F16M 13/022 5/503.1
2018/0142863 A1 * 5/2018 Cho ........................ F21V 3/023
2018/0356055 A1 * 12/2018 Magielse ................ F21V 23/06
2024/0102639 A1 * 3/2024 Li ........................... F21S 2/005

* cited by examiner

*Primary Examiner* — Keith G. Delahoussaye
(74) *Attorney, Agent, or Firm* — Patentbest; Andrew McAleavey

(57) ABSTRACT

A luminaire is formed of a closed, metamorphosing scissor linkage of light-emitting members. The luminaire is moveable through a number of positions, and as the linkage between members is expanded or contracted, it changes shape. The linkage may, for example, shift from a barrel- or drum-shaped configuration in one position to an umbrella-like downlight in another position. The luminaire may be suspended from a support structure.

14 Claims, 16 Drawing Sheets

DYNAMIC HANGING LUMINAIRE

TECHNICAL FIELD

Embodiments of the invention relate to luminaires, and more particularly, to dynamic luminaires.

BACKGROUND

Many familiar types of luminaires are fundamentally static in nature. For example, a typical pendant luminaire hangs down, emitting its light in the same way each time it is turned on.

Dynamic lighting, i.e., lighting in which the luminaire can change position or emitting characteristics in use, is somewhat prevalent in task lighting. For example, a desk or workbench lamp may have various hinges and pivots that allow it to be moved into multiple positions to better illuminate a workpiece. However, while dynamic task lighting is known, dynamic hanging luminaires are rare.

BRIEF SUMMARY

Aspects of the inventions relate to luminaires, and particularly, to hanging luminaires. A luminaire according to one aspect of the invention relates to a luminaire comprising a closed, metamorphosing scissor linkage of light-emitting members. The luminaire is preferably moveable through a number of positions, and as the linkage between members is expanded or contracted, it changes shape. In one particular embodiment, the linkage may shift from a barrel- or drum-shaped configuration in one position to an umbrella-like downlight in another position. To facilitate the metamorphosing features of the linkage, the center pivots of the linkage may be positioned away from (e.g., above or below) the vertical centerline of the linkage.

The linkage may be suspended from a support structure that provides both mechanical support and power. More specifically, in one embodiment, a number of connecting supports may depend from the support structure and be received in top pivots, i.e., joints, between members. Each of the top pivots may comprise a first member with male structure, and second member with female structure, and a bushing positioned between members. The bushing has a slot in an outer portion thereof and is open to both the first member and the second member internally. The first member and the second member may each have, e.g., an arcuate or circumferential slot that allows the connecting support, or conductors from the connecting support, to enter the member.

In a luminaire according to this aspect of the invention may have a spline, a light-emitting element mounted on the spline, and a light-transmitting structure covering at least the light-emitting element. The light-emitting element may be, e.g., one or more strips of LED linear lighting, and in some cases, one or more strips of COB-type LED linear lighting.

Another aspect of the invention also relates to a luminaire. This luminaire comprises a support structure and two or more closed, metamorphosing scissor linkages of light-emitting members suspended from the luminaire.

Other aspects, features, and advantages of the invention will be set forth in the description that follows.

BRIEF DESCRIPTION OF THE DRAWING FIGURES

The invention will be described with respect to the following drawing figures, in which like numerals represent like features throughout the description, and in which.

DETAILED DESCRIPTION

Figure 1:
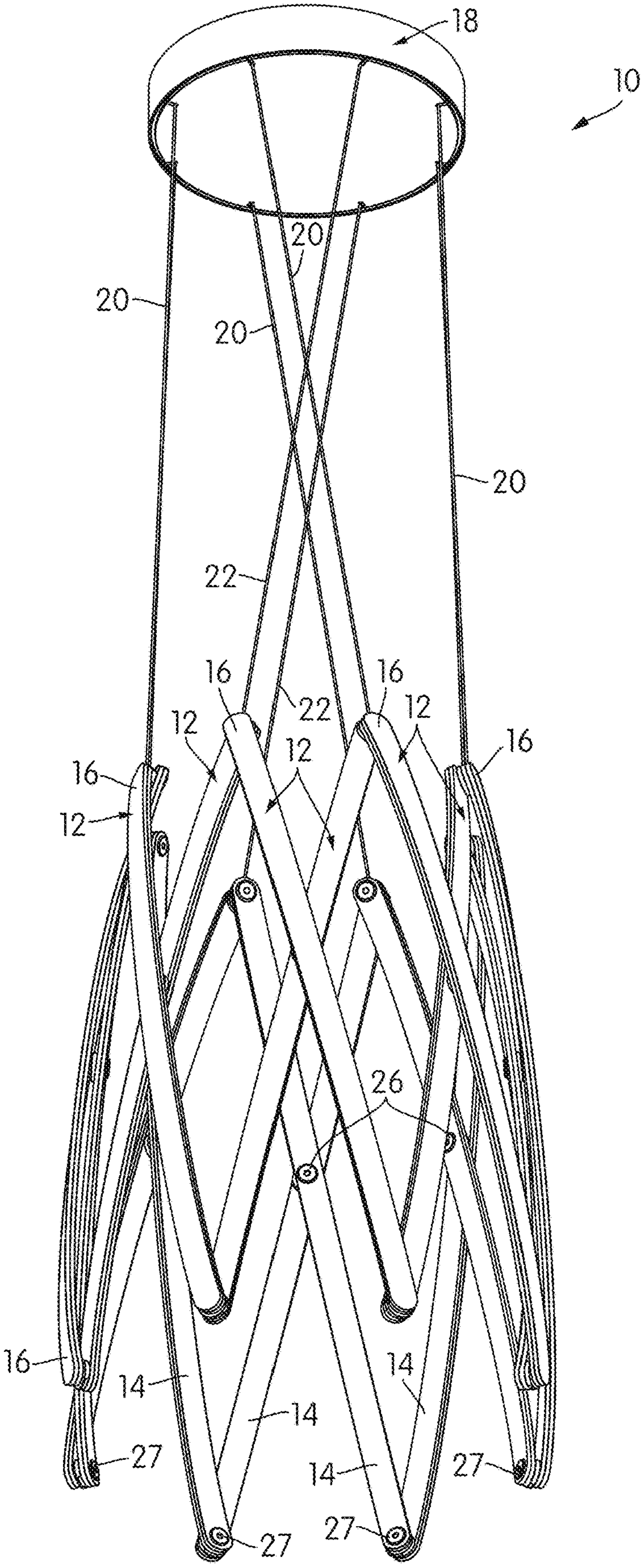
FIG. 1 is a perspective view of a dynamic hanging luminaire according to one embodiment of the invention.

FIG. 1 is a perspective view of a dynamic hanging luminaire, generally indicated at 10, according to one embodiment of the invention. In the illustrated embodiment, the hanging luminaire 10 comprises sixteen members 12 connected to each other in a closed, metamorphosing scissor linkage. That is, the hanging luminaire 10 is itself a closed, metamorphosing scissor linkage. M ore or fewer members 12 could be used. The members 12 themselves are long, narrow, and relatively thin, each member 12 having a gentle curvature over its length and, in this embodiment, rounded ends. The shape of each member 12 and the connections between the members 12 give the hanging luminaire 10 a barrel- or drum-shape in the position shown in FIG. 1.

For convenience in description, when the relevant attributes of all of the members 12 are the same, the same reference numeral is used to refer to all of them; however, as the description below bears out, there are some differences between the members 12, and particularly between the outer members 12 and the inner members 12. When those differences are relevant to specific description, specific reference numerals are assigned.

Each member 12 comprises a light-transmitting structure 14 mounted on a spline 16. Each spline 16 is a long, narrow strip of material that provides the shape and mechanical properties of the member 12. As will be described below in more detail, the splines 16 are typically made of a metal, such as aluminum. The light-transmitting structure 14 in the illustrated embodiment is a translucent diffuser, but in other embodiments, the light-transmitting structure 14 may have structure (lenses, prisms, etc.) that shapes or directs emitted light. Additional details of the construction of the members 12, including the light-emitting elements, will be set forth below.

The connected members 12 are supported by a support structure, indicated generally at 18, which may take a variety of forms, including the type of electrical box and canopy shown in FIG. 1. At its most basic, the support structure 18 is connected to fixed supports within, e.g., a ceiling. Additionally, in this embodiment, the support structure 18 serves the electrical needs of the hanging luminaire 10, providing a closed space in which to make electrical connections. While the features and arrangement of the support structure 18 are not critical, an electrical enclosure or junction box may be useful for safety reasons, or to comply with local electrical codes.

Typically, the hanging luminaire 10 will use low-voltage solid-state lighting. Therefore, the support structure 18, or some other component connected electrically to the hanging luminaire 10, will contain or include a driver, i.e., a device adapted to convert power from a first form to a second form suitable to power the hanging luminaire 10. The driver may, for example, convert high-voltage, alternating-current (AC) household or commercial power (e.g., at 120V, 220V-240V, or 277V AC) to low-voltage, direct-current (DC) power (e.g., 12V, 24V, or 48V DC). The driver may be a switched-mode power supply, or it may have some other architecture. The precise details of the power supplied to the hanging luminaire 10 are not critical so long as the hanging luminaire 10 is supplied with appropriate, sufficient power that allows it to emit light, preferably with as little visible flicker as possible.

The members 12 are physically suspended from the support structure 18 by a number of connecting supports 20, 22. Eight connecting supports 20, 22 are used in the embodiment of FIG. 1, but as with the members 12, more or fewer connecting supports 20, 22 may be used depending on the number of members 12, the mechanical load, and other factors. The connecting supports 20, 22 may be either rigid or flexible. In the illustrated embodiment, each connecting support 20, 22 comprises a length of flexible wire rope or cable of a gauge sufficient for the mechanical load.

There are many ways of bringing power to the members 12. For example, dedicated power delivery wires may be coextensive with the connecting supports 20, or separate, dedicated power wires may depend from the support structure 18 and connect with the members 12. In the illustrated embodiment, two of the connecting supports 22 serve a dual purpose: they serve as or provide conductors to power the lighting elements in the members 12. The connecting supports 22 that also serve as electrical conductors may be insulated with a clear insulation, e.g., clear poly(vinyl chloride) or polyurethane. In some cases, the connecting supports 20 that do not conduct may also be given such an insulation, while in other cases, the non-conducting connecting supports 20 may be bare. A thin layer of clear insulation has the advantage that conducting connecting supports 22 have much the same appearance as connecting supports 20 that do not serve as conductors. Powering low-voltage, solid-state lighting typically requires a pair of conductors: a positive conductor and a minus-return conductor. In order to maintain a common appearance for all of the connecting supports 20, 22, and to minimize the number of electrified connecting supports 22, a single electrified connecting support 22 may comprise or contain two (or more) separate electrical conductors (e.g., wires) in a single coaxial cable.

Figure 2:
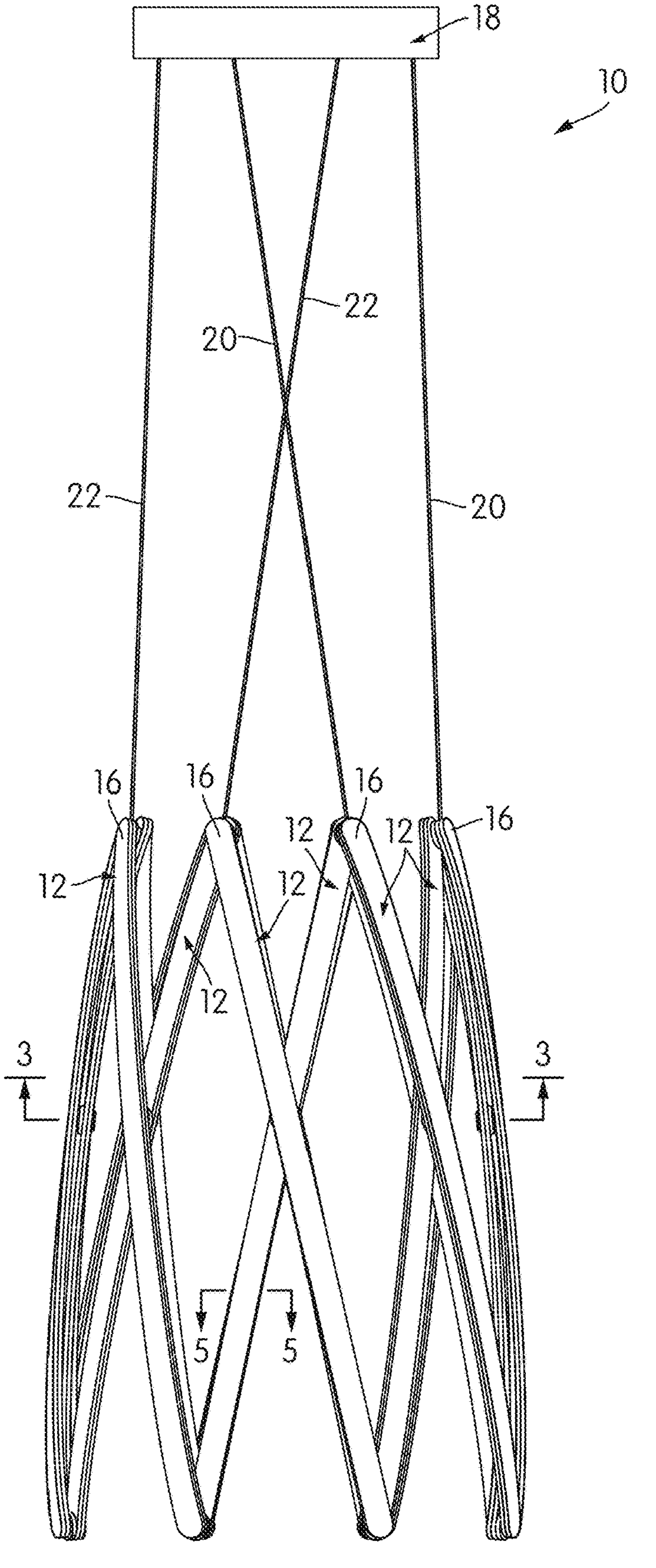
FIG. 2 is a front elevational view of the dynamic hanging luminaire of FIG. 1.
Figure 3:
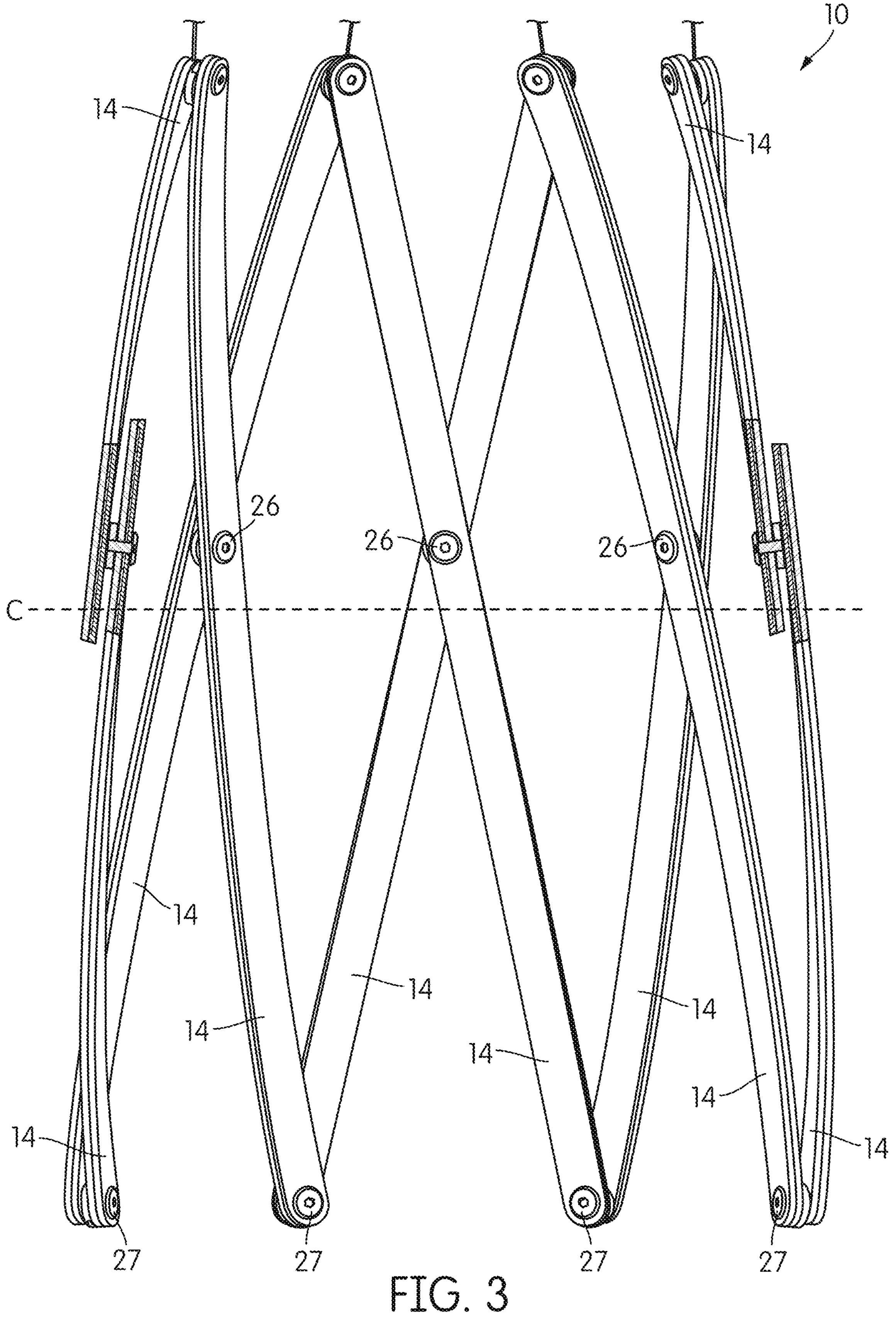
FIG. 3 is a cross-section taken through Line 3-3 of FIG. 2.

The details of the metamorphosing scissor linkage in which the members 12 are connected can be seen in FIG. 1, as well as in FIG. 2, a side elevational view of the hanging luminaire 10, and FIG. 3, a sectional view taken through Line 3-3 of FIG. 2. In a traditional, linear scissor linkage, members cross each other, with pivots at the centers of the members and at the ends of the members. Such traditional linkages extend when pressure is applied to one end. The metamorphosing scissor linkage in which the members 12 are joined employs some of the same basic structure and principles as a traditional scissor linkage but differs from a traditional scissor linkage in several ways.

First, as shown in FIGS. 1-3, the members 12 are connected to each other in a closed, round barrel- or drum-shape. The curved or bowed shape of the members 12 accentuates the barrel- or drum-shape of the hanging luminaire 10. Thus, there are no traditional ends to the linkage in which the members 12 are connected. (The term "closed," when used to refer to the linkage, refers not to any particular position that the linkage may assume, but to the fact that one end of the linkage is connected to the other.)

Second, the center pivots 26 of the members 12 are away from the horizontal centerline C of the hanging luminaire 10 (i.e., the centerline of the metamorphosing scissor linkage of which the hanging luminaire 10 is comprised). In the illustrated embodiment, as shown in FIG. 3, the center pivots 26 are above the horizontal centerline C of the hanging luminaire 10. In a traditional scissor linkage, the central pivots that connect two crossing members are usually aligned with the centers or middles of those members. Yet in the hanging luminaire 10, the center pivots 26 connecting crossing members 12 are about 2 inches (5 cm) above the horizontal centerline C. As will be described below in more detail, this placement of the center pivots 26 causes the hanging luminaire 10 to change shape as the members 12 move relative to one another, hence the use of the term "metamorphosing" scissor linkage in this description.

Third, in traditional scissor linkages, the members are considered to be mechanically rigid and are engineered to support a load without changes in shape, save for small, stress-induced deflections due to load, which are usually invisible to the naked eye. However, in the hanging luminaire 10, the members 12 may undergo significant deflections and shape changes as the members 12 move relative to one another. In fact, the hanging luminaire 10 may be engineered to encourage a certain amount of deflection and shape change in the members. The amount of deflection or shape-change that is allowed in the members 12 will vary from embodiment to embodiment. As will be described in more detail below, as the members 12 rotate with respect to one another and the metamorphosing scissor linkage expands and changes shape from the position shown in FIGS. 1-3, deflection of the members 12 helps the members 12—and the structure as a whole—to adapt to the changing mechanical forces and the directions of those forces.

In most embodiments, it is desirable to allow the members 12 to be moved relative to one another by the application of manual (i.e., human hand) pressure on the members 12. Preferably, the hanging luminaire 10 can be continuously moved from one position into another, i.e., while certain positions of the hanging luminaire 10 will be described below and shown in the accompanying drawing figures, a user can select, and move the hanging luminaire 10 into, any position within its overall range of motion using no more than typical manual force or pressure on the members. Moreover, preferably, the hanging luminaire 10 will retain a selected position when pressure is removed.

The present inventors have found that the above goals depend, in part, on the material used for the splines 16. More specifically, the material used for the splines 16 is preferably both flexible and able to withstand the forces involved. A typical material used for the splines 16 is a metal, like aluminum. When aluminum is used, it has been found that if a stiff alloy with high tensile strength, like 6061 aluminum, is used for the splines 16, the members 12 may be biased to "spring" into and out of particular positions, rather than moving continuously through a range of positions under manual pressure. While a bias toward specific positions may be desirable in some embodiments, a more ductile alloy, like 1050 aluminum, may be particularly suitable for embodiments in which continuous movement through a range of positions under manual pressure is desired.

Despite their advantage in the hanging luminaire, ductile alloys of aluminum like 1050 do have a potential drawback: they are difficult to weld, and as will be set forth below, the ability to weld to the splines 16 is helpful, if not absolutely necessary. Thus, in the illustrated embodiment, the splines 16 of the members 12 on the outside of the hanging luminaire 10 are made of 6061 aluminum, while the splines 16 of the members 12 on the inside of the hanging luminaire 10 are made of 1050 aluminum. The splines 16 may be about 3-5 mm (0.1-0.2 in) thick, e.g., 2.5 mm thick, and about 19 mm (0.75 inches) wide in the illustrated embodiment. Other sizes are possible.

The use of different materials for some of the splines 16 of the members 12 presents the possibility of balancing the mechanical properties of the hanging luminaire 10 as a whole. In general, the splines 16 may be made of the same material or they may be made of different materials, with the mechanical and other properties of the alloy or other material chosen to suit the type of movement that is desired. In other embodiments, plastics, woods, and other materials may be used for the splines 16, although in those cases, the positional-movement behavior of the members 12 may be different from the movement behavior of the members in embodiments that use, e.g., aluminum alloys.

Figure 4:
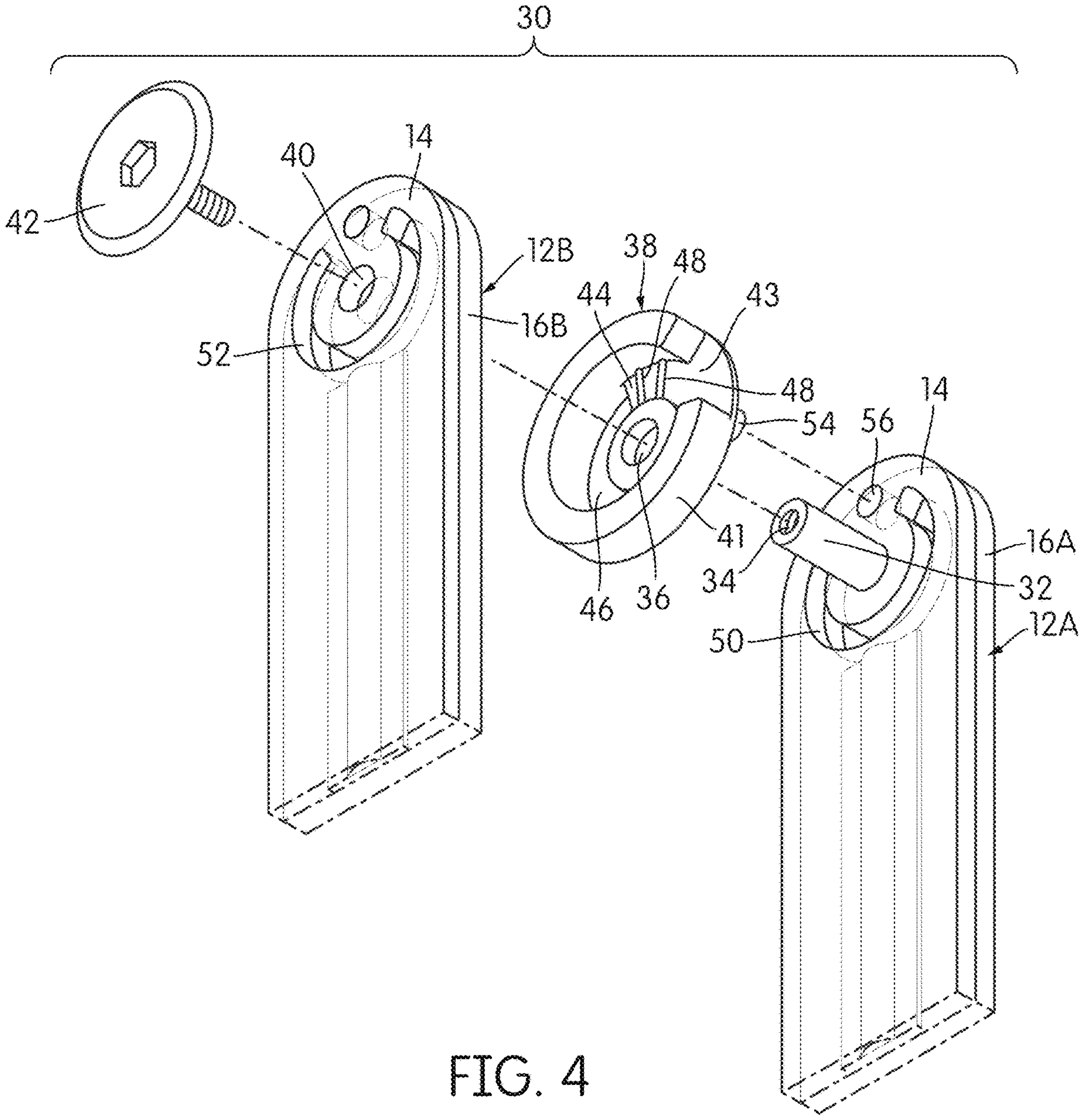
FIG. 4 is an exploded view of a joint between two of the members at the top of the hanging luminaire.

FIG. 4 is an exploded perspective view of an upper end joint, generally indicated at 30, that joins two members 12 at the top of the hanging luminaire 10. At the joint, the outside member, indicated as 12A for purposes of FIG. 4, has an inwardly-projecting post 32 with a threaded hole 34 aligned with the center of the post 32 and extending into it. The post 32 is made of metal and, in this embodiment, is welded to the spline 16 of the member 12A. It's for this reason that the spline 16A of the outside member 12A is made of a weldable alloy, such as 6061, while the spline 16B of the inner member is made of more ductile 1050 aluminum. This could vary: if a male structure, like the post 32, was on the spline 16B of the inside member 12B, the spline 16B of the inside member 12B could be made of 6061 aluminum while the spline 16A of the outside member 12A was made of the more ductile 1050 aluminum.

The post 32 is received in the central hole 36 of a bushing 38, and also in a central hole 40 at the end of the inside member 12B. A machine screw 42, in this case, a hex-head screw with a wide, flat head, inserts into the post 32 over the inside member 12B to secure the two members 12A, 12B and the bushing 38 together.

The bushing 38 itself is round in overall shape with a raised wall 41 around, and projecting outwardly from, much of its circumference. In the view of FIG. 4, the raised wall is oriented toward the inner member 12B. A large slot 43 is formed from a gap in the raised, circumferential wall 41. About half of the floor 44 of the bushing 38 is absent, leaving a large opening 46 that traverses circumferentially around about half of the floor 44. Adjacent each side of the opening 46, a set of two ribs 48 is provided on the floor 44 of the bushing 38.

In the upper end joint 30 shown in FIG. 4, the bushing 38 serves, in part, to allow the connecting supports 20, 22 to enter the joint 30. More specifically, the connecting supports 20, 22 enter through the slot 43 in the raised, circumferential wall 41 of the bushing 38. If the connecting support 20 is purely mechanical, it may, e.g., wrap around the interior of the bushing 38 and be secured, in part, by being pressed against the ribs 48 when the joint 30 is fully assembled. The wide extent of the slot 43 ensures that the connecting member 20, 22 can always extend straight to the support structure 18, regardless of the position of the members 12. If the connecting members 20, 22 are predominantly rigid, short lengths of wire or other such flexible pieces may be used at the ends of the connecting members 20, 22 to make connection with the joint 30.

If the connecting member 22 comprises or contains conductors, those conductors may be separated within the bushing, where the wires may pass inward, into the inner member 12B or, through the opening 46 in the bushing 38, outward to the outer member 12A. Each member 12A, 12B has a nearly fully circular slot 50, 52 that almost completely circumscribes the post 32 of the outer member 12A and the central hole 40 of the inner member 12B. In the outer member 12A, the slot 50 is formed only in the light-transmitting structure 14. In the inner member 12B, the slot 52 is formed in the spline 16B, although for reasons of interchangeable parts, the light-transmitting member 14 of the inner member 12B also has a slot 52. Any wires that need to enter the members 12A, 12B do so through the slots 50, 52, whose wide angular extent allows any wires to reach their destinations without undue strain irrespective of the angular position of the members 12A, 12B. With wires, the ribs 48 serve as strain relief.

The top joint 30 shown exploded in FIG. 4 is substantially similar to the center pivots 26 and the bottom joints 27. Compared with the top joint 30, the bushings used in the center pivots 26 and bottom joints 27 may not have a slot 43 in the raised, circumferential wall 41 of the bushing 36, or a solid bushing that merely acts as a spacer may be used, which is what is shown in the cross-section of FIG. 3. In some cases, the members 12 may not have slots 50, 52 to admit wires around the center pivots 26.

Notably, as shown in FIG. 4, the joint 30 does not contain any structure to limit the range of motion of the members 12A, 12B or to constrain the members 12A, 12B to particular positions, although in some embodiments, such structures may be used. However, the bushing 38 does have an alignment pin 54 that extends outward from the outward side of the floor 44 and is received in an alignment hole 56 in the outer member 12A. The alignment pin 54, in part, ensures that the slot 43 in the raised, circumferential wall 41 of the bushing 36 remains oriented correctly regardless of the positions of the members 12.

Figure 5:
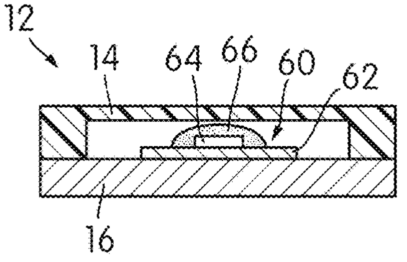
FIG. 5 is a cross-section taken through Line 5-5 of FIG. 2.

FIG. 4 also illustrates part of the internal configuration of each member 12A, 12B, as does FIG. 5, a cross-sectional view of one of the members 12 taken through Line 5-5 of FIG. 2. The light-transmitting structure 14 and the spline 16 define between them an open cavity. A light-emitting element 60 is disposed on the spline 16 so as to emit light toward the light-transmitting structure 14. In various embodiments, hanging luminaires 10 may use a number of different types of solid-state lighting. In the illustrated embodiment, the light-emitting element 60 is a strip of LED linear lighting, sometimes referred to as "strip light" or "tape light." The linear lighting 60 has a printed circuit board (PCB) 62, which may be either rigid or flexible. Rigid PCB may be made, e.g., of FR4, composite, ceramic, or metal. Flexible PCB is typically made of, e.g., thin polyimide or biaxially-oriented polyethylene terephthalate (BoPET; MYLAR®). Because of the curvature of the members 12 and the deflection expected during operation, flexible PCB 62 is preferred in most embodiments.

Most lighting of this type is of the blue-pump LED variety, in which the LEDs emit blue light, and a phosphor is positioned to absorb that blue-light and re-emit light of a different or broader spectrum. In some cases, the LEDs are in individual packages, each package topped with the phosphor. Here, the light-emitting element 60 is more specifically COB-type linear lighting, in which multiple LEDs or packages are covered by a common phosphor. Typically, the phosphor is encapsulated within a polymeric silicone binder, as silicones have an ability to tolerate the heat generated by the LEDs. FIG. 5 shows the LED structure 64 and phosphor 66 generically on the PCB 62.

The PCB 62 may include other structures, such as resistors, typically surface-mounted on the PCB 62. As relevant here, the PCB 62 would typically include sets of solder pads that allow positive and minus-return conductor wires to be soldered to the PCB 62. While there are many ways to connect linear lighting 60 to power, simply soldering the wires to the PCB 62 is perhaps the simplest and most reliable. As those of skill in the art will appreciate, the linear lighting 60 will typically not extend the entire working length of the spline 16. In particular, the linear lighting 60 will typically be interrupted at the center pivot 26. In that case, two separate strips of linear lighting 60 may be connected together by short wires that traverse around the center pivot 26 and are, e.g., soldered to the two respective PCBs 62. However, with a particularly narrow strip of linear lighting 60 and a particularly wide member 12, it may be possible to use a single, narrow strip of linear lighting 60 that traverses the entire working length of the spline 16 by extending to one side or the other of the center pivot 26.

The description above assumes that the linear lighting 60 emits white light, e.g., having a color temperature selected from the range of about 2400K to about 6500K, depending on the particular phosphor mix, with many embodiments emitting white light in the range of about 2700K to about 4200K. However, a hanging luminaire 10 may emit other colors of light, and it may also be equipped with combinations of different types of LEDs so that it can produce a plurality of colors by additive color mixing. For example, a strip of linear lighting may include red, green, and blue LEDs that are controlled independently, or a combination of red, green, blue and blue-pump white-emitting LEDs. If multiple types of LEDs are included, more of the connecting structures 20, 22 may be used as conductors to carry power/control signals for the different types of LEDs.

In other embodiments, the nature of the light-emitting element 60 may be entirely different. For example, in another embodiment, organic LEDs (OLEDs) may be used.

Figure 6:
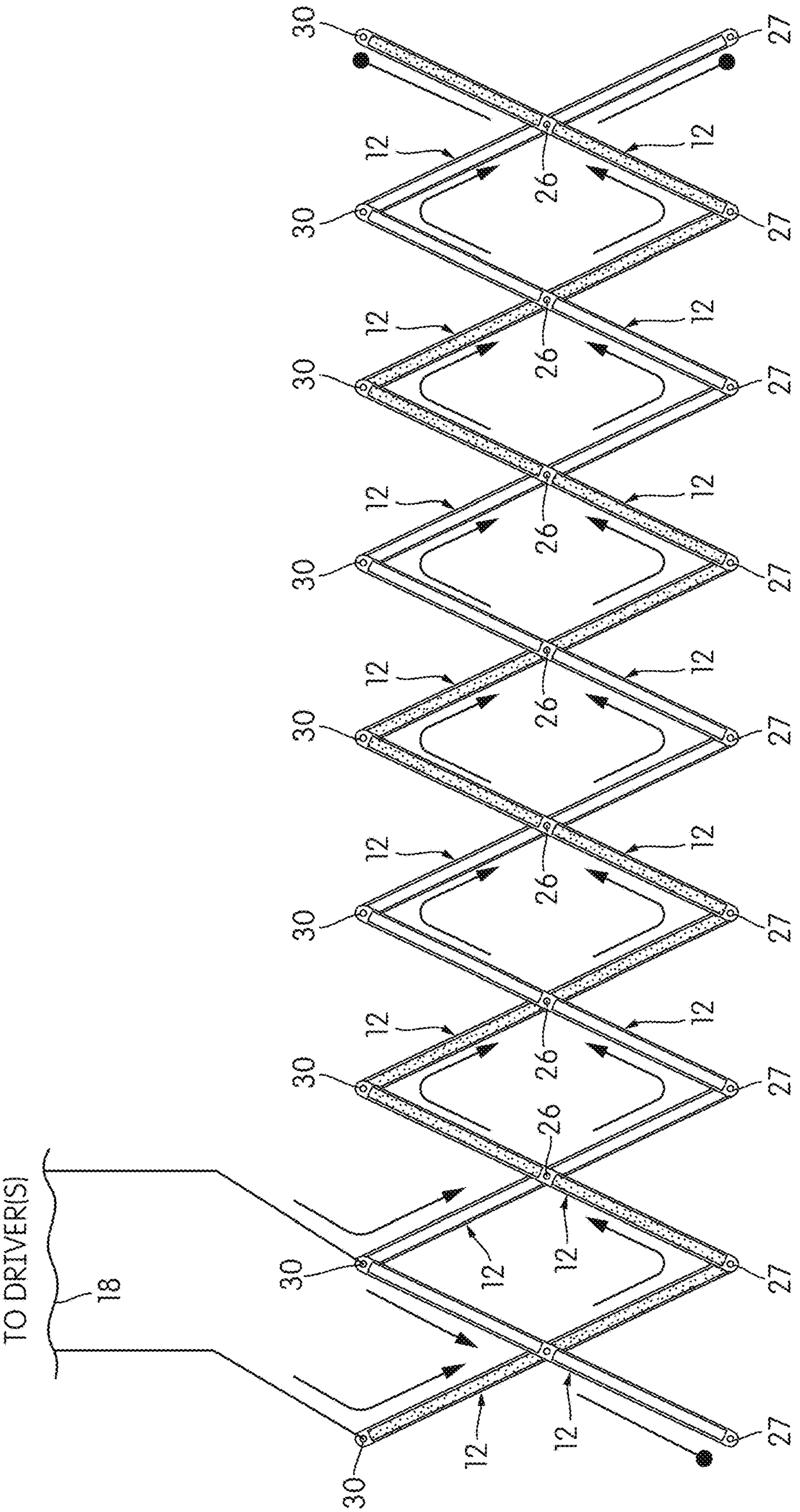
FIG. 6 is a schematic diagram illustrating the electrical circuits used to power the hanging luminaire, specifically showing how power flows from one member to the next in the hanging luminaire of FIG. 1.

FIG. 6 is a schematic diagram of the hanging luminaire 10, illustrating how power is conveyed from one member 12 to the next. In the view of FIG. 6, for simplicity in illustration, the hanging luminaire 10 is shown flat, i.e., with its ends disconnected. As those of skill in the art will note, because FIG. 6 is a schematic diagram, the center pivots 26 are not depicted in their proper positions.

In the illustrated embodiment, the hanging luminaire receives two conducting connecting supports 22. As was described above, each conducting connecting support 22 is a coaxial cable that carries both positive and minus-return conductors in a single cable. Each of the conducting connecting supports 22 powers one-half of the members 12, as shown in FIG. 6, by passing power from one member 12 to the next at the bottom joints between members.

While hanging luminaires 10 according to various embodiments of the invention may be powered in any way that causes them to light, the arrangement shown in FIG. 6 has certain advantages. Essentially, with two separate lines from a driver or drivers, there are two separate power circuits. If one power circuit has a break or a short, the other will continue to operate, and the hanging luminaire 10 will not entirely cease to function. The only fully-disabling condition in that case would be a complete failure of a single driver powering both circuits. Additionally, the multiple circuits may be useful if there are particularly long runs of linear lighting 60, because the cumulative resistance of long-run linear lighting 60 tends to cause a voltage drop, and thus, a drop in illumination, as one gets farther from the power source.

In certain situations, multiple drivers could be used, one for each of the circuits. This would provide additional redundancy and may allow the use of two drivers that are physically smaller than a single driver with the same power rating would be.

FIGS. 7-16 illustrate the hanging luminaire 10 in three different positions. The three positions illustrated in FIGS. 7-16 serve as examples of the range of positions that a hanging luminaire 10 might assume; as those of skill in the art will appreciate, the three selected positions are not the only positions that a hanging luminaire 10 might assume. Of the three positions, the first position of the hanging luminaire 10 is the position shown in FIGS. 1-3: the hanging luminaire 10 is mostly closed into a barrel- or drum-shape. While it is mechanically possible for the hanging luminaire 10 to assume a narrower, more closed position, the first position is typical for a more closed operating position. However, the hanging luminaire 10 may be placed into its narrowest-possible, most-closed position for shipping, because the most-closed position is the position that requires the least packaging.

Figure 7:
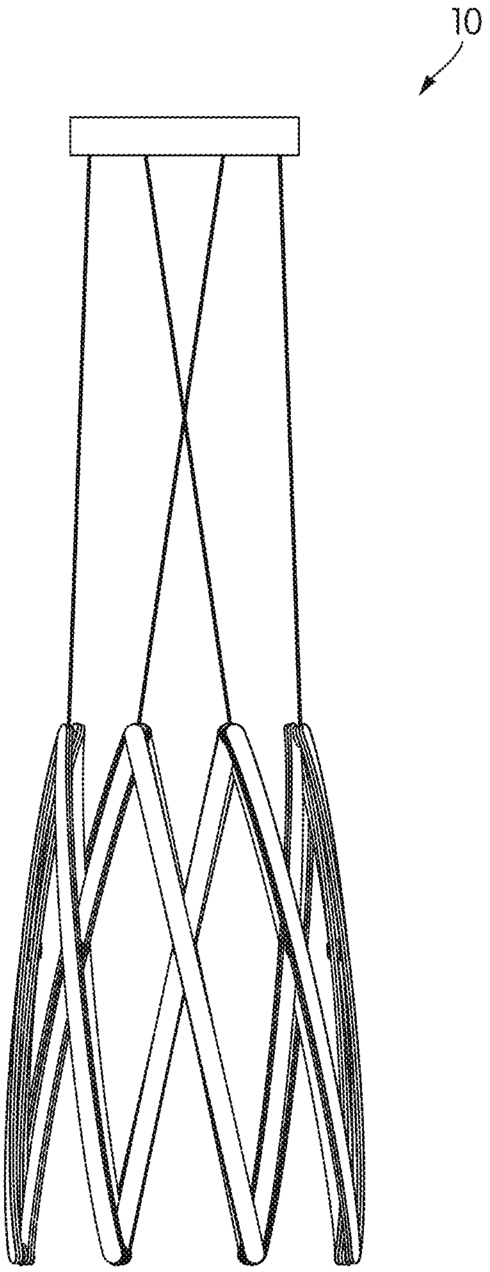
FIG. 7 is a side elevational view of the hanging luminaire of FIG. 1 in a first position.
Figure 8:
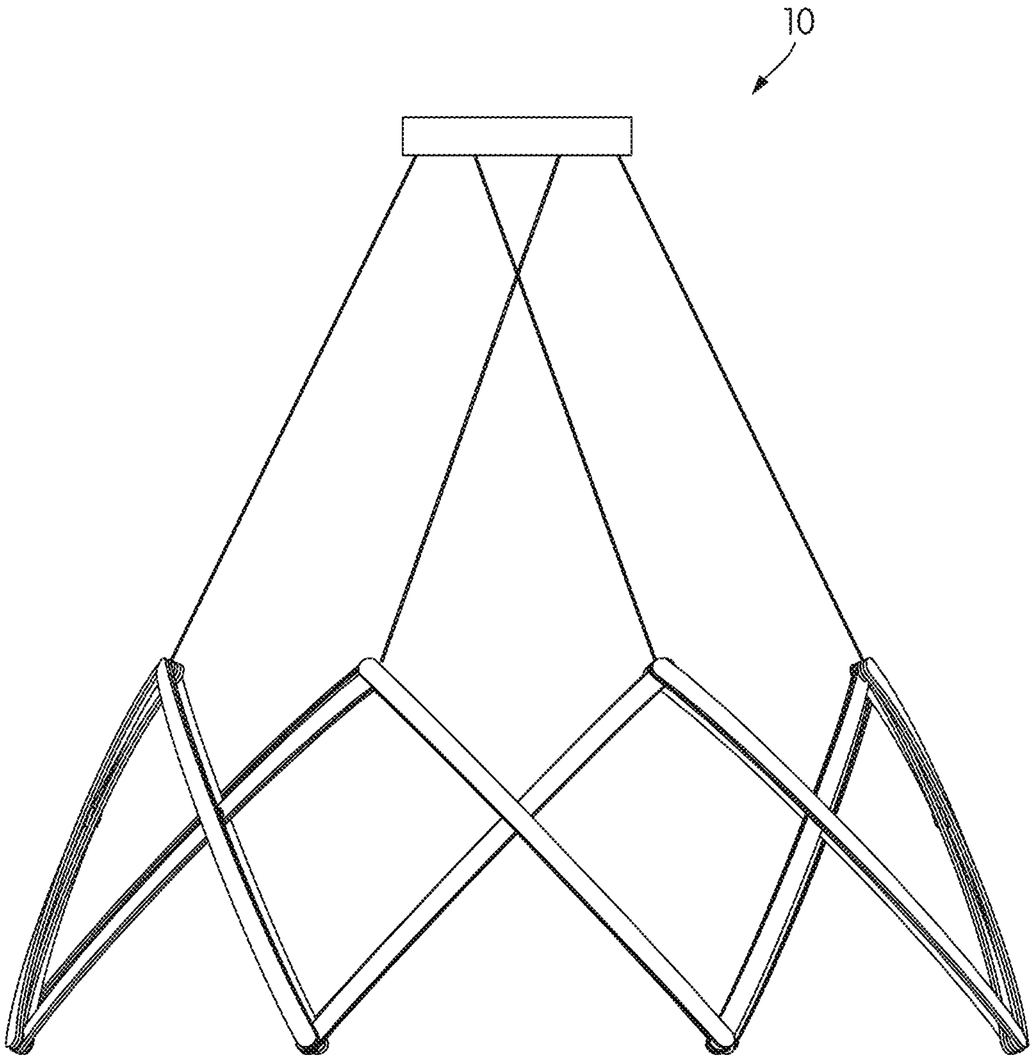
FIG. 8 is a side elevational view of the hanging luminaire of FIG. 1 in a second position.
Figure 9:
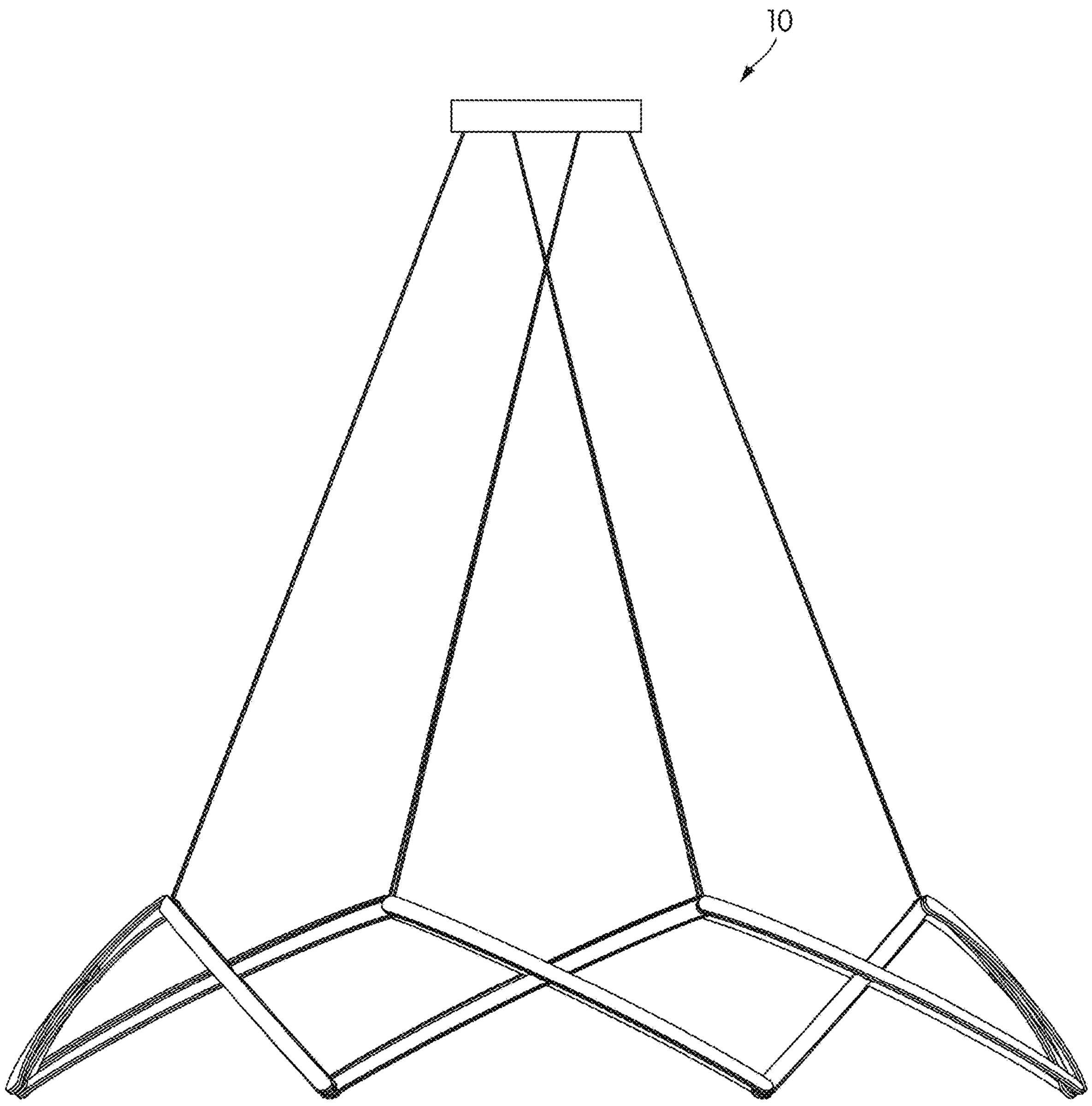
FIG. 9 is a side elevational view of the hanging luminaire of FIG. 1 in a third position.
Figure 10:
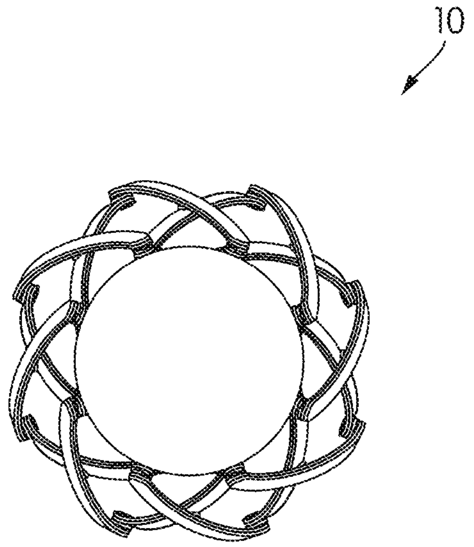
FIG. 10 is a top plan view of the hanging luminaire in the first position.
Figure 11:
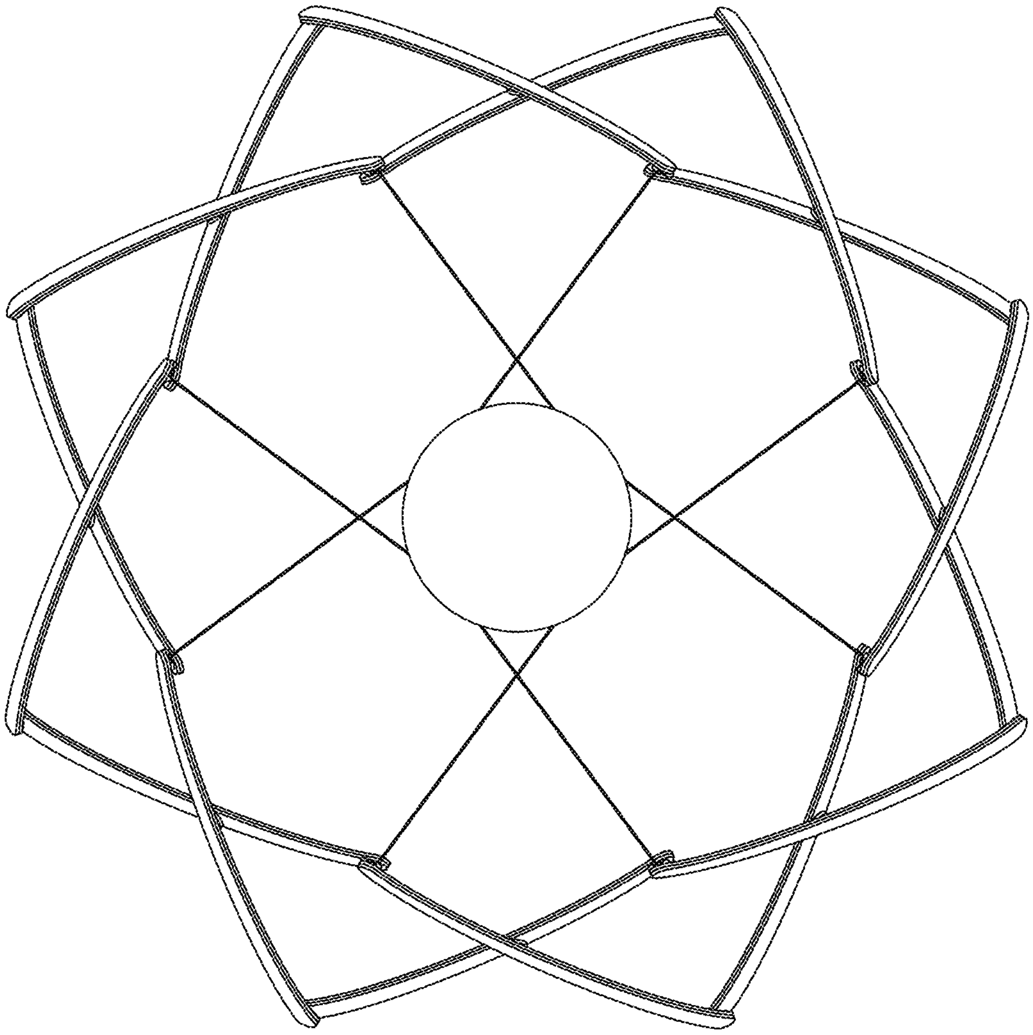
FIG. 11 is a top plan view of the hanging luminaire in the second position.
Figure 12:
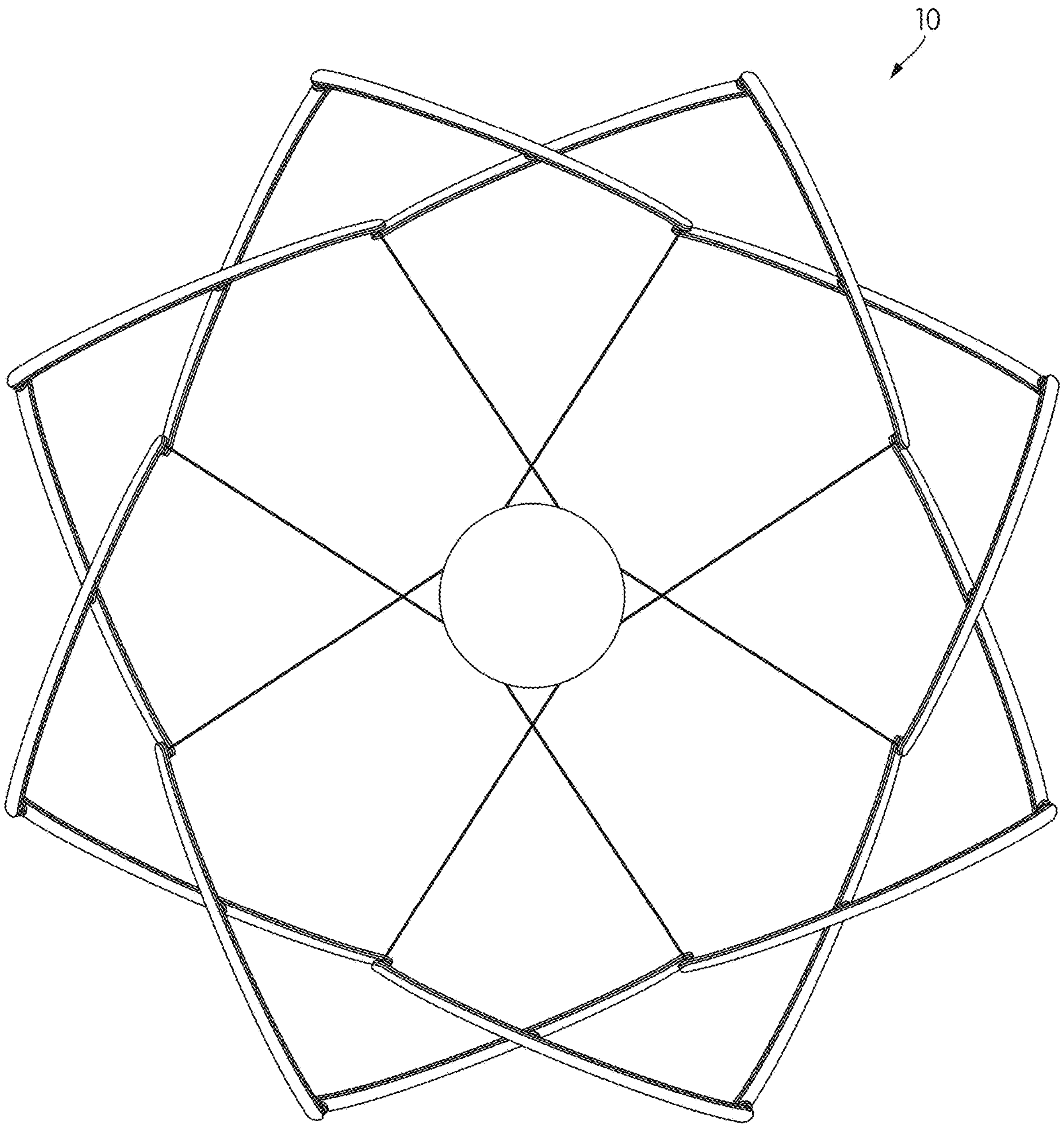
FIG. 12 is a top plan view of the hanging luminaire in the third position.
Figure 13:
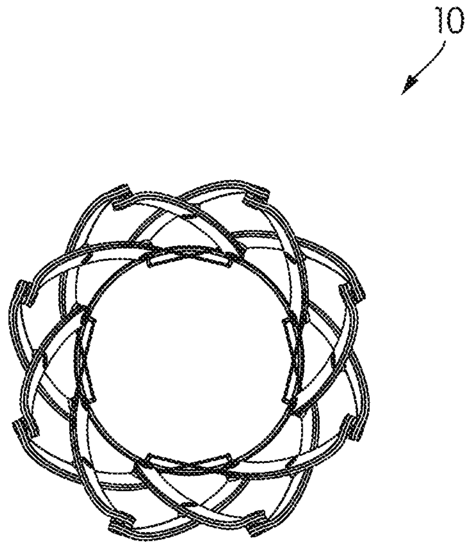
FIG. 13 is a bottom plan view of the hanging luminaire in the first position.
Figure 14:
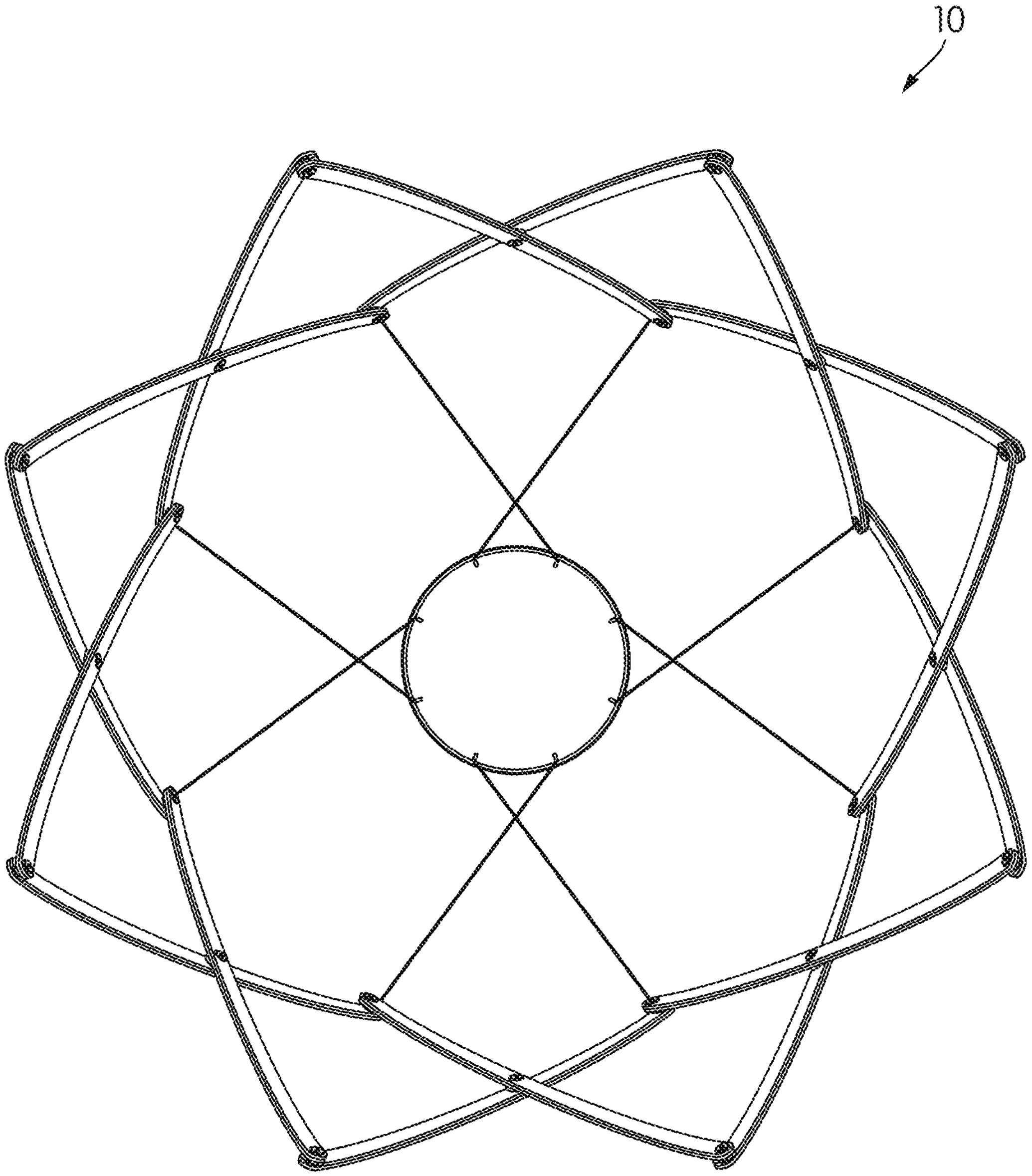
FIG. 14 is a bottom plan view of the hanging luminaire in the second position.
Figure 15:
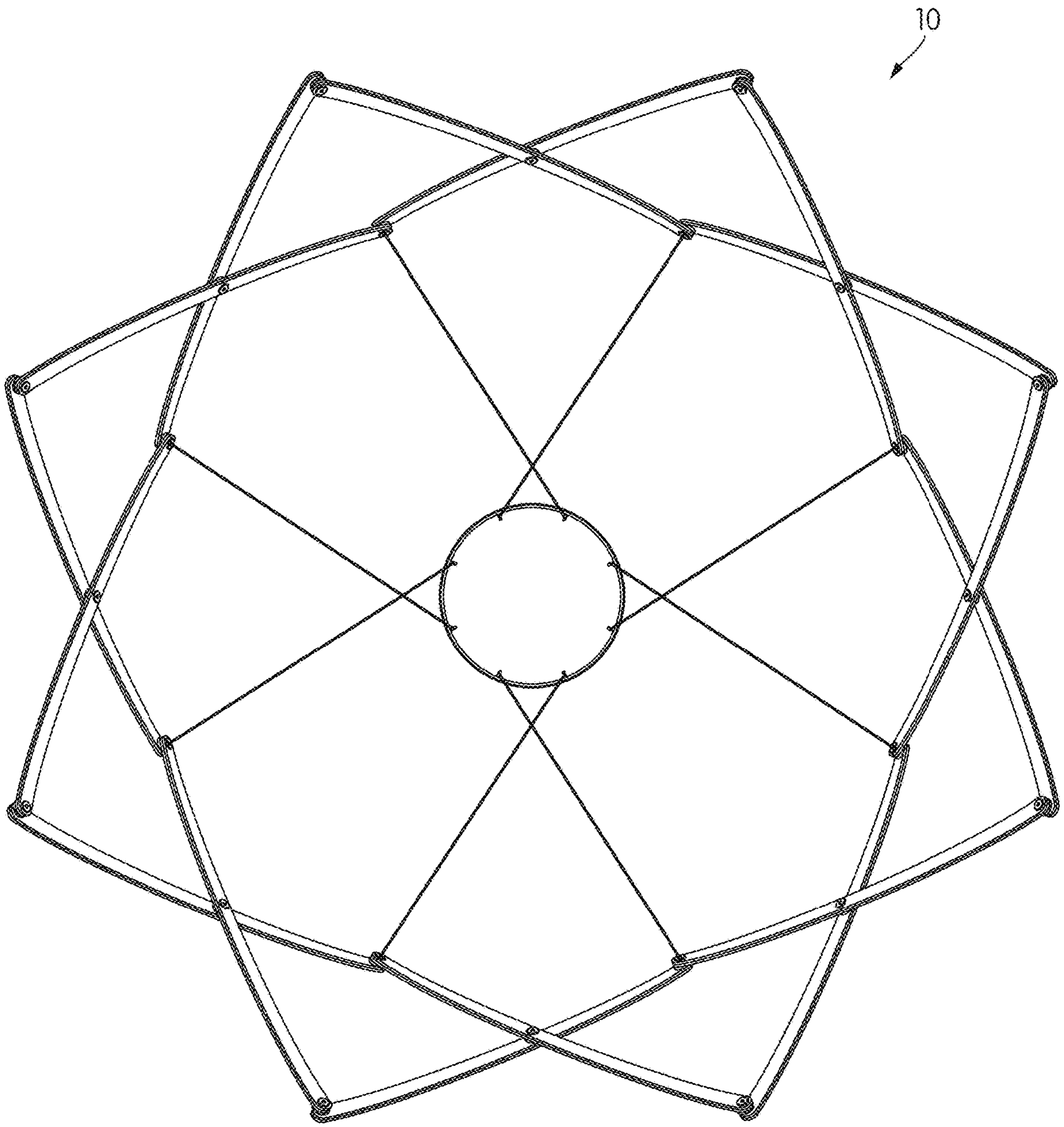
FIG. 15 is a bottom plan view of the hanging luminaire in the third position.
Figure 16:
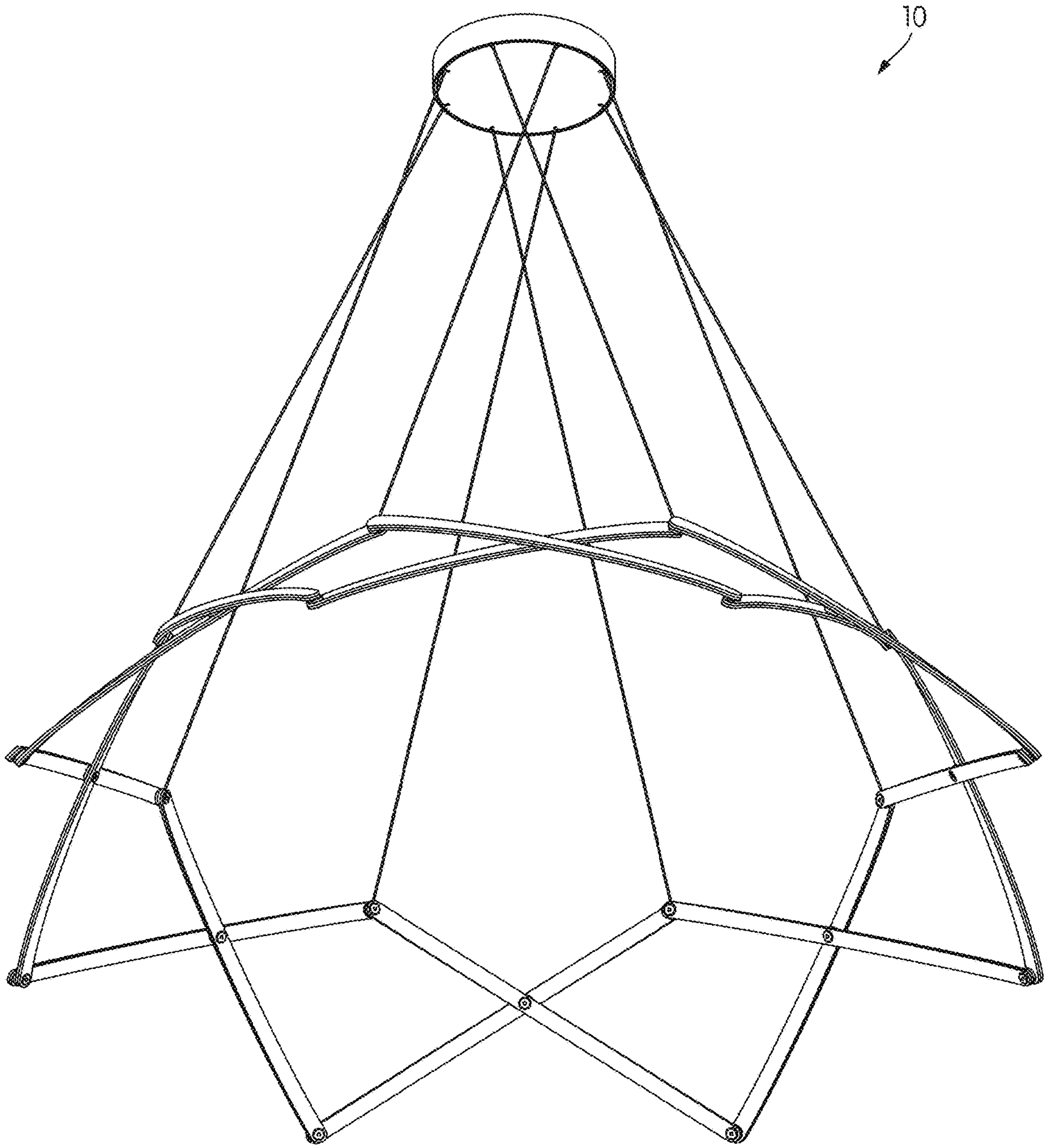
FIG. 16 is a perspective view of the hanging luminaire in the third position.

The effect of the metamorphosing linkage is that as the members 12 are pushed farther apart, the hanging luminaire 10 changes shape. Whereas the first position is a barrel- or drum-shape, as the members 12 move farther apart, the hanging luminaire 10 opens and more closely resembles an umbrella. The second position is one of these more open, umbrella-like positions, with the members 12 spaced apart at about half of their total range of motion. In the third position, the members 12 are spaced apart at about the practical limit of their range of motion, providing a broader, umbrella-like configuration. More specifically, with respect to FIGS. 7-16:

FIG. 7 is a side elevational view of the hanging luminaire 10 in the first position;

FIG. 8 is a side elevational view of the hanging luminaire 10 in the second position;

FIG. 9 is a side elevational view of the hanging luminaire 10 in the third position;

FIG. 10 is a top plan view of the hanging luminaire 10 in the first position;

FIG. 11 is a top plan view of the hanging luminaire 10 in the second position;

FIG. 12 is a top plan view of the hanging luminaire 10 in the third position;

FIG. 13 is a bottom plan view of the hanging luminaire 10 in the first position;

FIG. 14 is a bottom plan view of the hanging luminaire 10 in the second position;

FIG. 15 is a bottom plan view of the hanging luminaire 10 in the third position; and FIG. 16 is a perspective view of the hanging luminaire 10 in the third position.

Figure 17:
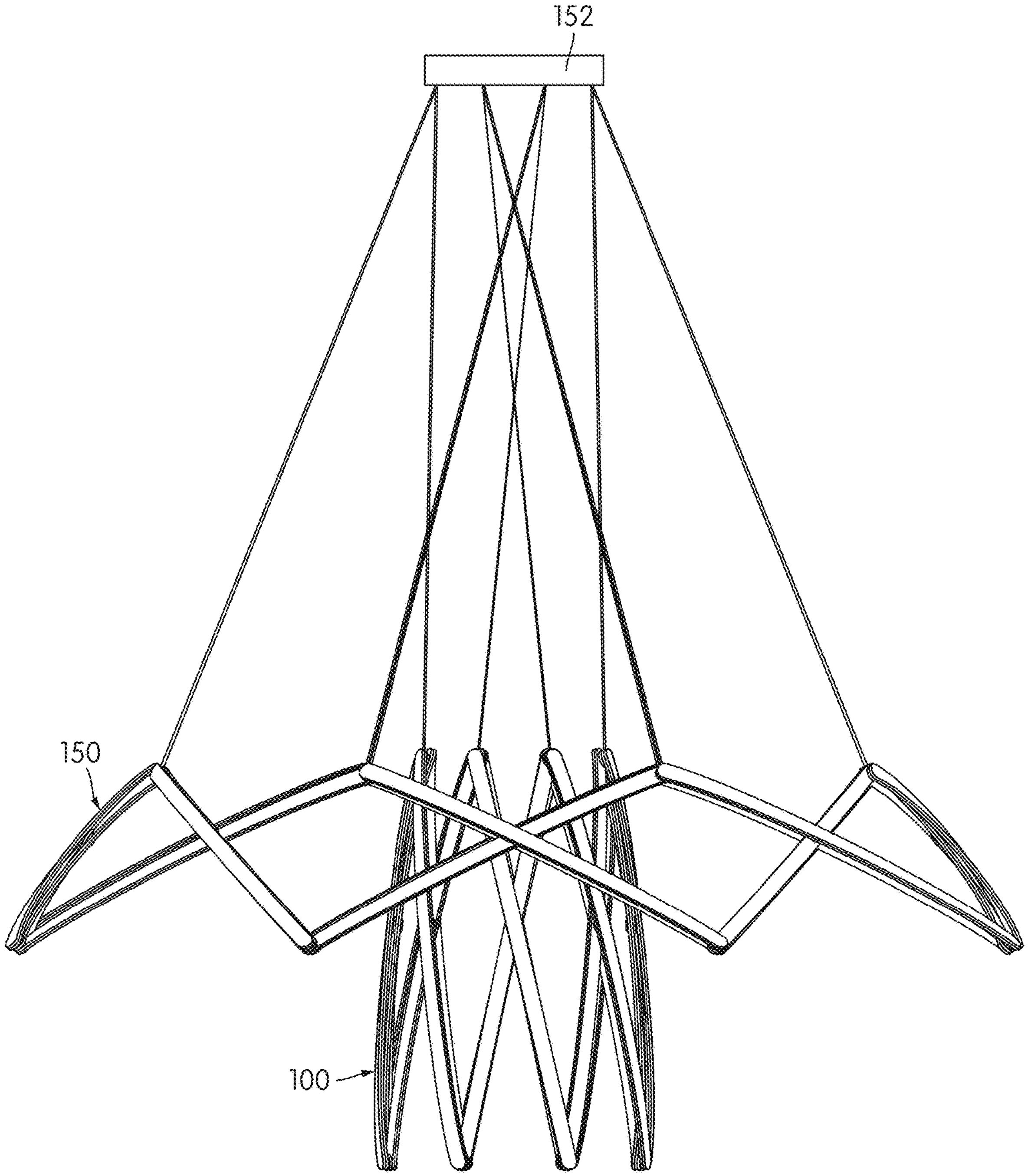
FIG. 17 is a perspective view illustrating the use of two hanging luminaires together, hanging from a single support structure, with one hanging luminaire in an open "umbrella" position and the other in a more closed barrel- or drum-position.

All of the above description assumes that a single hanging luminaire 10 hangs from a single support structure 18. In some embodiments, multiple hanging luminaires 10 could be used together, supported from the same supporting structure 18. FIG. 17 is a side elevational view illustrating this. In the view of FIG. 17, a first hanging luminaire, generally indicated at 100, and a second hanging luminaire, generally indicated at 150, are both supported by a single support structure 152. As shown in FIG. 17, the first hanging luminaire 100 assumes a more closed, barrel- or drum-shape similar to the position of the hanging luminaire 10 in FIGS. 1-3. The second hanging luminaire 150, by contrast, is nearly fully open, more closely resembling the third-position of the hanging luminaire 10 shown in FIG. 16. In this way, the two hanging luminaires 100, 150 can each hang down, arranged along the same vertical axis, and not interfere with each other.

In the view of FIG. 17, the two hanging luminaires 100, 150 are of the same size, and differ only in the positions they are placed in. However, this need not always be the case. Two or more hanging luminaires used together may be of different sizes. For example, the first hanging luminaire 100 could be smaller than the second hanging luminaire 150. In some cases, multiple smaller hanging luminaires could be used with one larger hanging luminaire.

As those of skill in the art will note, the luminaires described and illustrated here are primarily of the type that provide downlight, i.e., light directed downwardly. In many applications, so-called uplight, i.e., light directed upwardly, is also useful. Thus, in some cases, a hanging luminaire 10 that provides downlight could be paired or combined with hanging luminaire that provides uplight. Such a luminaire might, e.g., open upwardly from the more closed, barrel- or drum-shaped position shown in FIGS. 1-3. That can be accomplished by moving the center pivots 26 below the horizontal centerline C of the members 12; essentially, by flipping a hanging luminaire 10 upside down relative to the positions illustrated in the drawing figures. In some cases, an uplight-version of the hanging luminaire could be used alone.

The members 12 themselves may also differ significantly in width, shape, end shape, etc., providing a potentially wide variety of aesthetic appearances.

Additionally, while this description focuses on embodiments in which the luminaire hangs down from a support structure 18, a closed, metamorphosing scissor linkage of light-emitting members could be implemented as a floor lamp, a table lamp, etc. In that case, the members could be supported on a base by rigid connecting members or simply placed on a support surface with no dedicated base. Joints like the joint 30 described above would be used to allow a power cable or cables to enter the lamp. In general, closed, metamorphosing scissor linkages of light-emitting members may take many different forms.

In all of the above configurations, the members 12 are each arranged such that light is emitted toward the center of the luminaire 10 when the luminaire 10 is in the barrel- or drum-shaped configuration and is emitted downwardly when the luminaire 10 is in the open, umbrella-like third position described above. This is so because, in every case, the linear lighting 60 is installed on the inner, concave surface of the spline 16. The sense of this could be reversed. In that case, the linear lighting and light-transmitting structure would be mounted on the outer, convex surface of the spline 16. Ultimately, each member of the resulting linkage would include the same components as a member 12. However, the cross-section of each member would be reversed relative to the cross-section of the member 12 shown in FIG. 5. With this configuration, light would be emitted outwardly in the barrel- or drum-shaped configuration of FIG. 1 and upwardly in the third position of the luminaire described above.

Additionally, linear lighting and a light-transmitting structure could be installed on both sides of a spline 16. In that case, light would be emitted both outwardly and inwardly. In more open, umbrella-like positions, a single luminaire of this type would serve as both an uplight and a downlight.

While the invention has been described with respect to certain embodiments, the description is intended to be exemplary, rather than limiting. Modifications and changes may be made within the scope of the invention, which is defined by the appended claims.

What is claimed is:

1. A luminaire, comprising:

a closed, metamorphosing scissor linkage of light-emitting members, the closed, metamorphosing scissor linkage of light-emitting members connected by a plurality of top pivots at first ends of the light-emitting members, a plurality of bottom pivots at second ends of the light-emitting members, and a plurality of center pivots located between the first ends and the second ends of the light-emitting members and positioned away from a vertical centerline of the metamorphosing scissor linkage;

wherein each of the light-emitting members includes a spline, a light-emitting element disposed on the spline, and a light-transmitting structure covering at least the light-emitting element.

2. The luminaire of claim 1, wherein the closed, metamorphosing scissor linkage has the plurality of center pivots located above a vertical centerline of the metamorphosing scissor linkage.

3. The luminaire of claim 1, further comprising:

a plurality of connecting supports, each of the plurality of connecting supports connecting to one of the plurality of top pivots.

4. The luminaire of claim 3, wherein at least some of the plurality of connecting supports are, or comprise, electrical conductors.

5. The luminaire of claim 4, wherein each of the plurality of top pivots comprises:

male structure on a first of the members;

female structure on a second of the members; and a bushing positioned between the first of the members and the second of the members, the bushing having a slot in a sidewall thereof and being open internally to the first of the members and the second of the members.

6. The luminaire of claim 1, wherein the light-emitting element comprises one or more strips of LED linear lighting.

7. The luminaire of claim 6, wherein the one or more strips of LED linear lighting comprise one or more strips of COB LED linear lighting.

8. The luminaire of claim 1, wherein the luminaire is suspended from a support structure.

9. A luminaire, comprising:
a support structure;
a plurality of connecting supports; and
a closed, metamorphosing scissor linkage of light-emitting members suspended from the support structure by the plurality of connecting supports;
wherein the linkage has center pivots above a vertical centerline of the linkage; and
wherein some of the plurality of connecting supports carry power to the members of the linkage.

10. The luminaire of claim 9, wherein each of the plurality of connecting supports is received in a top pivot between members of the linkage.

11. The luminaire of claim 10, wherein each of the top pivots comprises:
male structure on a first of the members;
female structure on a second of the members; and
a bushing positioned between the first of the members and the second of the members, the bushing having a slot in a sidewall thereof and being open internally to the first of the members and the second of the members.

12. The luminaire of claim 11, wherein the first of the members and the second of the members each have at least one arcuate or circumferential slot in alignment with the bushing.

13. A luminaire, comprising:
a support structure;
two or more closed, metamorphosing scissor linkages of light-emitting members suspended from the support structure, each of the two or more closed, metamorphosing scissor linkages connected by
a plurality of top pivots at first ends of the light-emitting members,
a plurality of bottom pivots at second ends of the light-emitting members, and
a plurality of center pivots located between the first ends and the second ends of the light-emitting members and positioned away from a vertical centerline of the metamorphosing scissor linkage;
wherein each of the light-emitting members includes a spline, a light-emitting element disposed on the spline, and a light-transmitting structure covering at least the light-emitting element.

14. The luminaire of claim 13, further comprising:
a plurality of connecting supports suspending each of the two or more closed, metamorphosing scissor linkages from the support structure;
wherein some of the plurality of connecting supports carry power to the members of the two or more closed, metamorphosing scissor linkages.

* * * * *